United States Patent [19]

Inagaki et al.

[11] 4,375,323

[45] Mar. 1, 1983

[54] WATERPROOF HOUSING FOR CAMERA

[75] Inventors: Tetsuhiko Inagaki; Takashi Iwata, both of Sakai; Tetsuro Oya, Osaka; Toshinori Imura, Sakai, all of Japan

[73] Assignee: Minolta Camera Kabushiki Kaisha, Osaka, Japan

[21] Appl. No.: 295,981

[22] Filed: Aug. 25, 1981

Related U.S. Application Data

[63] Continuation of Ser. No. 91,237, Nov. 5, 1979, abandoned.

[30] Foreign Application Priority Data

Nov. 14, 1978 [JP] Japan ................. 53-140326

[51] Int. Cl.³ ............................................. G03B 17/08
[52] U.S. Cl. ....................................................... 354/64
[58] Field of Search ........................... 354/63, 64, 288; 352/242; 358/99, 229; 206/204, 316, 811; 220/378, 324, 295, 298, 304, 285, 357, 358, 319, 322; 150/52 J

[56] References Cited

U.S. PATENT DOCUMENTS

| | | | |
|---|---|---|---|
| 1,726,240 | 8/1929 | Schmidt et al. | 220/322 |
| 2,701,659 | 2/1955 | Baltosser | 220/358 |
| 3,294,274 | 12/1966 | Spitzberg | 220/358 |
| 3,412,661 | 11/1968 | Soumar | 354/64 |
| 3,827,069 | 7/1974 | Stowell | 354/64 |
| 3,831,182 | 8/1974 | Shimizu | 354/64 |
| 4,041,507 | 8/1977 | Ko et al. | 354/64 |
| 4,061,371 | 12/1977 | Prather et al. | 220/324 X |

FOREIGN PATENT DOCUMENTS 2812917 10/1978 Fed. Rep. of Germany ...... 354/288

*Primary Examiner*—Gonzales John
*Attorney, Agent, or Firm*—Wolder, Gross & Yavner

[57] ABSTRACT

A camera water-tight housing includes a hollow body member having a rectangular rear access opening delineated by the rear borders of the body member walls and a rectangular transparent lid having grooves formed in its inside face along its long sides. Each groove includes opposing faces, the inside faces being stepped and a resilient packing engages the face stepped portions and is retained therein by the borders of a pressure plate secured to the lid inside face. In the housing closed condition, the wall end borders along the opening long sides engages the lid grooves between the backing and the groove outer faces to compress the packing and effects a water-tight seal. Locking members are provided on the body member end walls and include hook portions for engaging tabs projecting from the lid to lock it in its closed position and cams for engaging the tabs and ejecting the lid when the members are rotated to separate the hook portions from the tabs. A camera mechanism is located in the housing and includes separate covers for the film and battery chambers, the covers being locked in closed position by the lid carried pressure plate in the housing closed condition.

21 Claims, 7 Drawing Figures

WATERPROOF HOUSING FOR CAMERA

This is a continuation of application Ser. No. 091,237 filed Nov. 5, 1979, abandoned.

BACKGROUND OF THE INVENTION

The present invention relates generally to improvements in water-tight housings and it relates particularly to an improved housing of water-tight construction for receiving therein a camera or various camera mechanisms.

A housing for receiving therein a camera body or various camera mechanisms and serving as an outer casing for the camera, in general, is provided with a comparatively large opening, through which the photographic film may be loaded into or removed from the camera. Because of such a large opening in the housing, a poor hermetic or waterproof condition of the housing occurs. Particularly, in the case where it is desired to provide a flat rectangular opening for the camera, for example, in the case where the camera is of flat rectangular parallelopiped form, and the casing must receive therein such a flat rectangular parallelopiped camera body, or in the case where the casing itself is used as the camera outer casing and the camera employs a 110 sized film-cartridge, a product of Eastman Kodak Company, it has been difficult to impart water-tightness to the casing. For facilitating an understanding of the present invention, reference is made to FIGS. 1 and 2 of the drawings which illustrate an art device wherein reference numeral 2 designates a casing or housing, in which are incorporated various mechanisms of a camera (not shown), such as an exposure control mechanism, a shutter mechanism, etc. A cover 4 is provided for sealing an opening in casing 2, and an annular packing 6 made of a resilient material is fitted on the inner peripheral wall of the cover 4 which is provided with an outer flange. In the condition shown in FIGS. 1 and 2 where cover 4 registers with and engages the opening in casing 2, packing 6 is sealingly embraced between the confronting faces of the casing inner wall and cover 4, thereby preventing ingress of water into the casing. In order to provide an improved water-tight condition, annular packing 6 is of somewhat greater diameter than clearance between the confronting faces of the inner wall of casing 2 and cover 4, so that when the cover is coupled to the casing, the annular packing is free to deform under compression due to its elasticity, in the manner shown in FIG. 1. The camera body including casing 2 is so constructed as to receive therein a 110 sized film cartridge, a product of Eastman Kodak Company, and the aforesaid opening has a flat rectangular profile as shown in FIG. 2, for ease of insertion or removal of the film cartridge into or from the camera body. The major sides 2a and 2b delineating the housing rectangular opening are of much greater length than the minor sides thereof. When cover 4 and casing 2 are intercoupled, the inner peripheral wall of casing 2 is urged outwardly under the influence of the restoring force of annular packing 6, particularly major side walls 2a and 2b, which are undesirably outwardly flexed in the direction of arrows A and B in FIG. 2. This is due to fact that the biasing force of annular packing 6 acts on the angular portions at which the long sides are joined with the housing short sides, as a force in spreading the angular portions, and that such a force is concentrated at the mid portions of the long sides of the opening which are of minimum flexing strength or resistance. Consequently, a gap 8 occurs between annular packing 6 and the inner wall of casing 2, with the consequent failure to provide a watertight seal for the casing.

Furthermore, in the construction described above, the portion of casing 2, which defines the access opening, suffers from deformation during long service and eventually assumes an outward curve. Thus, a gap is formed between the packing and the casing, resulting in poor water-tight condition therebetween.

SUMMARY OF THE INVENTION

It is an object of the present invention to provide an improved water-tight casing which is suitable for receiving therein a camera body or for housing therein various mechanisms of a camera so as to serve as a highly superior waterproof outer casing of the camera.

It is another object of the present invention to provide a waterproof casing member of improved structure, wherein that portion of the casing which delineates an access opening is highly resistant to being deformed, flexed or curved.

It is a further object of the present invention to provide an improved casing member of greatly increased durability without any reduction in its water-tight condition during long service.

The above and other objects of the present invention will become apparent from a reading of the following description taken in conjunction with the accompanying drawings which illustrate preferred embodiments thereof.

A water-tight housing according to the present invention comprises a pair of separably coupled housing members which in their coupled condition delineate a housing cavity and in their uncoupled condition provide access to the cavity through an opening in one of the housing members, a first coupling section extending along a border of the opening and a second coupling section located on the other member, one of the coupling sections including a groove having opposing faces and the other coupling section including a tongue projecting into and extending along the groove in the coupled condition of the housing members and a resilient packing superimposed on a face of the tongue and with the tongue being embraced between the groove opposite faces to compress the packing in the coupled condition of the housing. The access opening is advantageously rectangular with the long sides delineated by tongues which engage respective grooves in the other member which is a rectangular lid. A locking mechanism is provided for releasably locking the housing members in coupled condition.

The improved structure overcomes the drawbacks of the earlier structures preventing any flexing or bowing of the housing walls and any consequent formation of gaps which permit the leakage of water.

DESCRIPTION OF THE PREFERRED EMBODIMENTS

Figure 1:
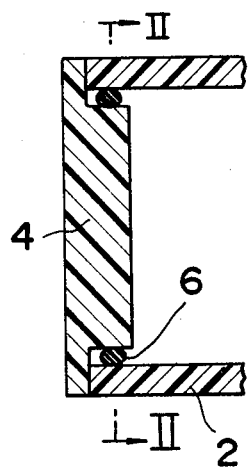
FIG. 1 is a longitudinal cross section view of a prior art casing member.
Figure 2:
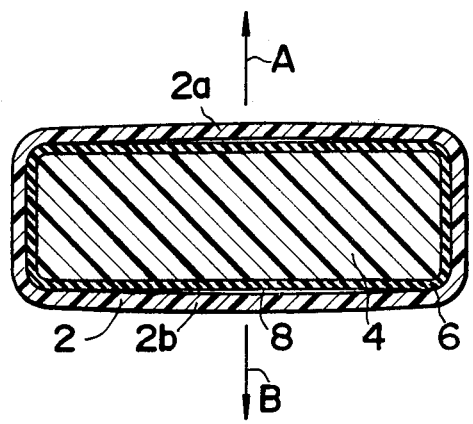
FIG. 2 is a cross sectional view taken along the line II—II of FIG. 1.
Figure 3:
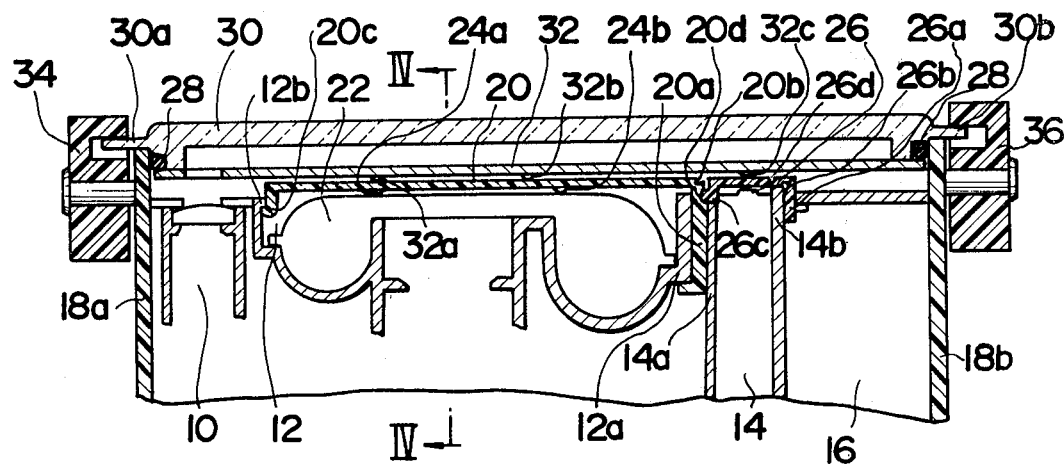
FIG. 3 is a fragmentary cross sectional plan view of a preferred embodiment of the present invention.

Reference is now made to the drawings, particularly FIGS. 3 through 6 thereof which show a first embodiment of the present invention, wherein the improved housing member is used as an outer casing for a waterproof pocket camera employing a film cartridge of the 110 type which is a product of Eastman Kodak Company. As seen in FIG. 3, which is a cross sectional plan view showing the placement of components in the rear portion of the pocket camera, within the camera body, there are provided, from the left to the right in the drawing, a finder portion 10, a film cartridge chamber 12, a dry-cell chamber 14, and a housing 16 for an electronic flash device, all of which are integrally formed in an outer casing 18 made of a synthetic organic polymeric resin or plastic material. An auxiliary lid member or inner cover 20 exclusively for use in the film chamber is provided at the rear of film chamber 12, and is made of a flexible material such as a suitable plastic. The inner cover 20 has at one end an anchoring portion 20a fixedly sandwiched inserted between a film chamber wall 12a and a dry-cell chamber wall 14a, and provided with a flexible self-hinge portion 20b, and at the other end a hook or latch portion 20c. Hook portion 20c releasably snap engages a lip or step portion 12b on the wall of the film chamber when inner cover 20 is closed or fitted in the film chamber, thereby releasably locking inner cover 20 in its closed position. When it is desired to uncover inner cover 20, an operator places his finger at a dent (not shown) provided in the free end portion of the inner cover, and pulls the inner cover in a manner to flex the mid portion of the inner cover to the rear. Compression springs 24a and 24b are attached to the front or inner face of inner cover 20, so as to urge a film cartridge 22 toward an aperture or an exposure plane when inner cover 20 assumes a closed position.

The rear access opening to dry cell chamber 14 is covered with inner cover 26 used exclusively for the dry cell chamber. Inner cover 26 is made of a flexible material such as a suitable plastic, and anchored at one end 26a to a wall 14b of the dry-cell chamber. Inner cover 26 has at its anchored end 26a, a flexible hinge portion 26b and at the other end a projection 26c, so that when inner cover 26 is swung to a closed position, projection 26c engages a recess 20d provided in fixed portion 20a of inner cover 20, whereby inner cover 26 is releasably locked in its closed position. Contacting pieces 26d are attached to the front wall of inner cover 26, the contacting pieces being adapted to contact the terminals of the housed dry cells.

A rectangular lid member or rear cover 30 to be hermetically fitted through the medium of a rubber packing 28 to outer casing 18 is provided at the rear or access opening of outer casing 18. Rear cover 30 is made of an achromatic transparent plastic. A metal press plate 32 is suitably attached to the front face of the rear cover 30. Two or more projections 32a, 32b and 32c are located on the front wall of press plate 32, so as to forwardly press inner cover 20 for the film chamber and inner cover 26 for the dry cell chamber. Rear cover 30 has opposite side tabs 30a and 30b, which project outwardly beyond the side walls 18a and 18b of outer casing 18 to be engaged by lock mechanisms 34 and 36, which will be hereinafter described to thereby releasably secure rear cover 30 to the rear of outer casing 18.

In the camera shown, the cover for the film chamber and the cover for the dry cell chamber are separately formed in the non-water-tight structure, and in turn, rear cover 30 is water-tight, so as to effect a water-tight seal of the dry cell chamber as well as the film chamber at the same time, thereby reducing the risk of water entering the casing. If the rear cover possessed the combination of the functions of the film chamber cover and the dry cell chamber cover, it could occur that the dry cells might drop from the dry cell chamber when the rear cover is removed for loading or unloading a film into or from the film chamber or the film might drop from the chamber at the replacement of used dry cells with fresh ones. With a view to eliminating such inconvenience, the aforesaid inner covers 20 and 26 positioned inward of rear cover 30 are provided exclusively for use with film chamber 12 and dry cell chamber 14, respectively.

Figure 4:
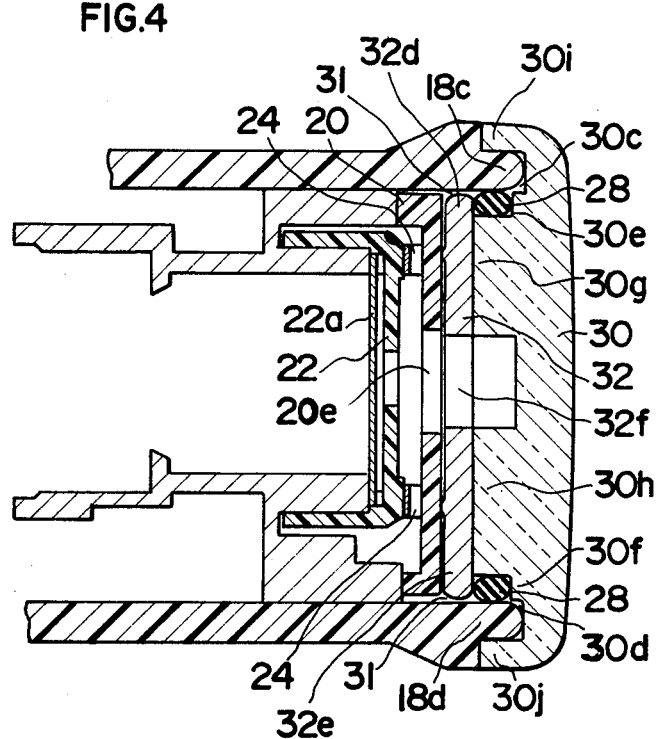
FIG. 4 is a longitudinal cross sectional view taken along the line IV—IV of FIG. 3.

As seen in FIG. 4, which is a longitudinal cross sectional view showing the water-tight construction of rear cover 30, there are positioned from left to right a film 22a, film cartridge 22, inner cover 20 for the film chamber, compression spring 24, press plate 32 and rear cover 30. Windows 20e and 32f are provided in inner cover 20 for the film chamber and press plate 32, so that the numerals representing the film frame number printed on back paper of film 22a are observable through these windows and through the transparent rear cover 30.

Grooves 30c and 30d which are of substantially transverse U-shaped cross section are formed in the front or inner face of rear cover 30 along the long sides thereof, proximate their outer edges. Step portions 30e and 30f are provided in the inside faces of U-shaped grooves 30c and 30d, respectively, that is along the inside legs of the U-shaped grooves. Inner central portions 30g and 30h of the rear cover project higher or more forwardly in level that the front free end faces of the opposite end or upper and lower edge portions 30i and 30j of the rear cover. A peripheral or annular packing 28 of circular transverse cross section and formed of a resilient material engages grooves 30c and 30d and registers with stepped portions 30e and 30f. Press plate 32 is rigidly secured to the inner central portions or banks 30g and 30h of the rear cover, with outer borders or edges 32d and 32e thereof covering the inner parts of respective grooves 30c and 30d. These outer edges of the rear cover thus function to prevent packing 28 from dislodging from the respective grooves 30c and 30d. Step portions 30e and 30f provided in the inside faces of the U-shaped grooves reduce clearances between the outer borders of the press plate 32 and the bottom faces of the respective U-shaped grooves, so that the spacings between the outer borders 32d and 32e and the inner or base shoulders of the step portions 30e and 30f are somewhat larger than the diameter of packing 28, thus eliminating any undesirable movement to a tilted posture or the shifting of the packing within the grooves.

The casing top and bottom wall rear or free ends 18c and 18d defining the top and bottom edges of the access opening in outer casing 18 engage or fit in grooves 30c and 30d in contacting relation to the outer faces of the packing 28, thereby vertically compressing the packing toward the groove inside faces. End portions or flanges 30*i* and 30*j* of the rear cover engage the outer walls of the rear end portions 18*c* and 18*d* of the outer casing 18. Briefly, packing 28 and rear ends 18*c* and 18*d* of outer casing 18 respectively engage or fit in U-shaped grooves 30*c* and 30*d* in rear cover 30. With such arrangement, in the event that rear ends 18*c* and 18*d* of outer casing 18 are urged vertically outwardly of the outer casing by the restoring force of packing 28, rear ends 18*c* and 18*d* are restrained at their outside faces by the end portions 30*i* and 30*j* of the rear cover, from curving or flexing outwardly, and hence are prevented from forming any gap between the packing and the casing rear ends 18*c* and 18*d*. As a result, a water-tight seal is uniformly provided between the casing rear ends and the coupled portions of the rear cover, whereby a highly water-tight rear cover seal of the casing is obtained. In this camera, the waterproof structure is provided only for the long or major sides of rear cover 30 and outer casing 18, because rear end portions 18*c* and 18*d* of the major sides of the outer casing are subject to being flexed and curved due to their much greater length than that of the minor sides. The water-tight coupling construction need not be provided for the whole of the coupled portions, but only for essential parts. Such water-tight coupling structure is particularly useful for a waterproof pocket sized camera of flat rectangular parallelopiped form having linear long continuous, water-tight coupled portions. Clearances are provided between the inner faces of the outer casing 18 and the respective opposite edges of press plate 32, so that when packing 28 is pressed toward the film cartridge chamber by water pressure, part of respective packing 28 is admitted into the proximate clearances 31 delineated thereby thus, providing further improved waterproofness for the casing.

Figure 5:
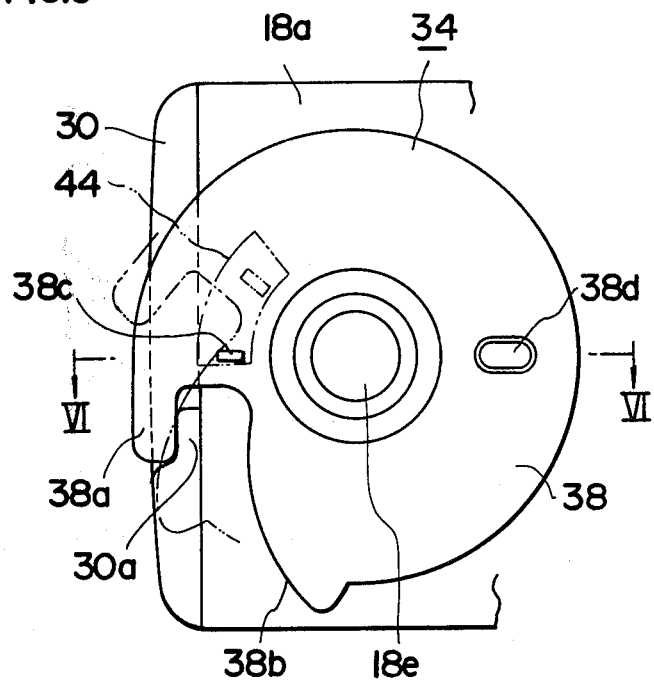
FIG. 5 is a side view of a lock mechanism incorporated in the casing member of FIG. 3.
Figure 6:
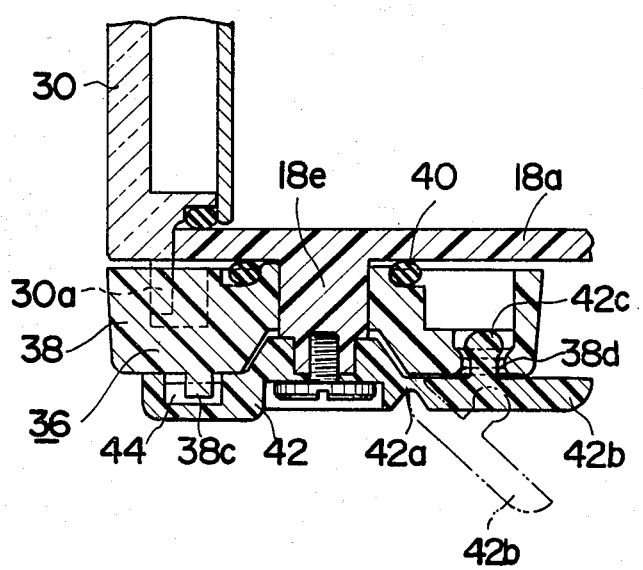
FIG. 6 is a cross sectional view taken along the line VI—VI of FIG. 5.

A pair of opposite lock mechanisms 34 and 36 are provided for locking and releasing the rear cover 30 to and from the casing 18 and are best seen in FIGS. 5 and 6. Integrally formed on one side wall 18*a* of outer casing 18 is a rotary shaft 18*e*, on which is rotatably mounted a lock member 38 formed of a hard or rigid plastic. Lock member 38 has a peripheral hook portion 38*a* adapted to engage a side end portion 30*a* of rear cover 30 to thereby lock rear cover 30 in a closed position, and a peripheral cam portion 38*b* adapted to contact side end portion 30*a* of the rear cover when lock member 38 is rotated clockwise as viewed in FIG. 5, thereby urging side end portion 30*a* rearward. Lock member 38 also has a projection 38*c* and a diametrically opposite radial slot 38*d*. As seen in FIG. 6, ring biased packing 40 made of resilient material is fitted between the hub of lock member 38 and end wall 18*a* of the outer casing. A stop member 42 formed of a vinyl plastic is superimposed on lock member 38 and is non-rotatably secured to the end of shaft 18*e* on the end wall of outer casing 18, so as to retain the lock member on the rotary shaft. Stop member 42 is provided with a concentric arcuate groove 44 in the inner face thereof, which arcuate groove receives therein projection 38*c* of lock member 38. By the engagement of projection 38*c* with the end opposite end faces of arcuate groove 44, lock member 38 is restricted to rotate between a rearcover locking position (a position shown by a solid line in FIG. 5). Stop member 42 supports by itself a hinge portion 42*a* and an extension 42*b* adapted to swing at the hinge portion. Extension 42*b* is formed with a projection 42*c* adapted to engage a hole 38*d* in lock member 38 when hook portion 38*a* of a lock member 38 engages side end portion 30*a* of rear cover 30 and retains it in a closed position (the position shown by a solid line in FIG. 5). When projection 42*c* of stopper member 42 engages slot 38*d* in lock member 38, the rotation of lock member 38 is prevented, so that rear cover 30 is prevented from being inadvertently released due to rotatation of lock member. When an operator desires to remove the rear cover, the operator pulls extension 42*b* of stop member 42 in a manner to swing the same outwardly about hinge portion 42*a* so as to disengage projection 42*c* from slot 38*d*, so that lock member 38 is free to rotate. When lock member 38 is rotated clockwise, as viewed in FIG. 5, then hook portion 38*a* disengages side end portion 30*a* of rear cover 30. By the further clockwise movement of lock member 38, cam portion 38*b* of lock member 38 urges side end portion 30*a* of rear cover 30 rearward, whereby rear cover 30 is easily and conveniently separated from outer casing 18.

Another lock mechanism 36 of the same construction as lock mechanism 34 is provided on the other end wall 18*b* of outer casing 18, so that rear cover 30 is firmly secured to outer casing 18 at the opposite end portions 30*a* and 30*b* thereof by the two lock mechanisms 34 and 36.

Figure 7:
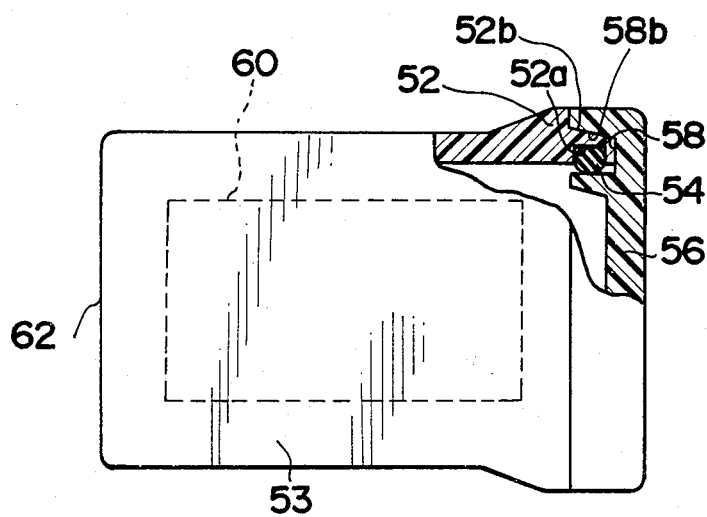
FIG. 7 is a plan view, partly in cross section, of the essential part of another embodiment of the present invention.

Referring now to FIG. 7 which illustrates another embodiment of the present invention, a waterproof casing member 53 includes an access opening border rear edge portion 52 which has an inner groove or step 52*a*, in which a resilient packing 54 is fitted, with a part thereof protruding transversely outwardly therefrom. A cover 56 is provided with a groove 58 of U-shaped transverse cross section and engaged by the outer end of the edge 52 of casing member 53 and packing 54. A pair of confronting faces 52*b* and 58*b* of edge portion 52 of the casing member and U-shaped groove 58 in cover 56 respectively, are similarly sloped or tapered for facilitating the coupling of cover 56 to casing member 53.

In the casing 53, there is contained an internal mechanism 60 of an electronic flash device. In this case, the front wall 62 of casing member 53 is a transparent window, and replacement of dry cells with fresh ones is conducted by removing the rear cover 56.

Instead of a camera, the body or internal mechanism of a radio set, a tape recorder, a watch or the like may be housed in the waterproof casing 53 and the cover 56 may be removed for the replacement of consumed cells with fresh ones as well as the manipulation of an operating member provided internally of the casing.

The water-tight structure may be provided continuously for the whole of the coupled portions or discontinuously or locally for essential coupled portions.

The water-tight outer casing for a camera according to the present invention is basically a sealed casing consisting of a first member and a second member, the first member having grooves of U-shaped cross section, in which the ends of the second member and the packing are fittedly held in mutually overlapping relation. In the aforesaid sealed casing, the first member may be a cover member, and in turn, the second member may be a casing member, or the first member may be a casing and in turn, the second member may be a cover member. As an alternative, both the first and the second members may be casing members capable of being water-tightly coupled to each other, to thereby provide a sealed casing.

In the sealed casing according to the present invention, there is eliminated any risk that the end portions of the first or second member are flexed due to the pressure of the packing when the first and second members are intercoupled so that no clearance is formed therebetween. Even an opening sufficiently large enough for an outer casing for a waterproof camera may be positively hermetically sealed, and there is thus obtained a camera casing greatly improved in waterproof properties.

While there have been illustrated and described preferred embodiments of the present invention, it is apparent that numerous alterations, omissions and additions may be made without departing from the spirit thereof.

What is claimed is:

1. A waterproof housing structure for cameras comprising:
    separably intercoupled first and second members delineating a sealed chamber;
    a projecting first abutting portion provided on one of said members and having an inside face facing said sealed chamber and an outside face positioned at the backside of said inside face;
    a second abutting portion provided on the other of said members and having therein a groove defined by a pair of opposite side faces and a bottom for loosely receiving therein said first abutting portion;
    a packing interposed between said first abutting portion inside face and one of said groove side faces, the other one of said groove side faces engaging said outside face of said projecting first abutting portion so as to press said packing against said one of said groove side faces when said first and second members are intercoupled; and
    a member fixed to said second abutting portion and partly covering said groove so as to prevent said packing from slipping from said groove when one of said first and second members is separated from the other.

2. A waterproof housing structure as set forth in claim 1, wherein said other one of said groove side faces is of the configuration so as to engage in face-to-face contact with said outside face of said projecting first abutting portion.

3. A waterproof housing structure as set forth in claim 2, wherein one of said first and second members includes an outer case for housing a camera mechanism and has therein an opening of flat rectangular configuration, and the other of said first and second members includes a lid member of flat rectangular configuration separably closing said opening.

4. A waterproof housng structure as set forth in claim 3, wherein said first and second abutting portions are respectively provided along long sides of said opening and said lid member.

5. A waterproof housing structure for cameras comprising:
    separably intercoupled first and second members delineating a sealed chamber, one of said members including an outer case for housing a camera mechanism and having therein an opening of flat rectangular configuration and a film chamber accessible through said opening and an auxillary lid member for opening and closing said film chamber and the other of said members including a lid member of flat rectangular configuration separably closing said opening;
    a projecting first abutting portion provided in one of said members;
    a second abutting portion provided on the other of said members and having therein a groove defined by a pair of opposite faces and a bottom for loosely receiving therein said first abutting portion; and
    a packing positioned in said groove in mutually overlapping relationship with said first abutting portion, said overlapping first abutting portion and packing member being embraced between said groove side faces.

6. A waterproof housing structure as set forth in claim 5, wherein said auxiliary lid member has a window and said lid member is made of transparent material.

7. A waterproof housing structure as set forth in claim 5 further comprising a pressure plate secured to said lid member for urging said auxiliary lid member toward said film chamber, and wherein said lid member is provided with said groove in which said packing is located, said groove being partly covered by said pressure plate, thereby preventing the separation of said packing.

8. A waterproof housing structure as set forth in claim 5 further comprising a tab projecting from an end of said lid member, and a locking member rotatably mounted on said outer case proximate said opening and including a hook portion and a cam portion alternatively engaging said tab to respectively press said lid member against said outer case and urge said lid member for forcibly removing said lid member from said outer case.

9. A water-tight housing comprising a pair of separably coupled housing members which in their coupled condition delineate a housing cavity and in their uncoupled condition provide access to said cavity through an opening formed in one of said members, a first coupling section extending along a border of said opening and a second coupling section located on said other member, one of said coupling sections including a groove having opposing first and second faces and the other said coupling sections including a tongue having an end face, an inside face facing said cavity and an opposite outside side face and projecting into and extending along said groove with said tongue outside side face in substantially parallel face-to-face engagement with said groove first face in the coupled condition of said members and a resilient packing superimposed on said inside face of said tongue and with said tongue being embraced between said groove opposing faces to compress said packing in the coupled condition of said members.

10. The water-tight housing of claim 9 including means for releasably locking said members in a coupled condition.

11. The water-tight housing of claim 10 wherein one of said housing members includes a hollow member having a rectangular access opening in an end thereof with said tongue extending along a long side of said opening and the other of said housing members includes a rectangular lid having said groove formed in its inside face and extending along a long border thereof.

12. The water-tight housing of claim 11, wherein said locking means comprises a tab projecting from an end of said lid and a locking member rotatably mounted on said hollow member proximate said access opening and including a hook portion and a cam portion alternatively engaging said tab to respectively forcibly advance said lid toward said hollow member and lock said lid in coupled condition and to unlock and urge said lid to a separated condition.

13. The water-tight housing of claim 11, wherein one of said groove opposite faces is provided with a groove in which said packing is retained.

14. The water-tight housing of claim 10 including means for releasably latching said locking means in a position locking said housing members in their coupled condition.

15. A water-tight housing comprising a pair of separably coupled housing members which in their coupled condition delineate a housing cavity, one of said housing members including a hollow member having a rectangular access opening in an end thereof and a tongue extending along a long side of said opening and the other of said housing members including a rectangular lid having a groove with opposing faces formed in its inside face and extending along a long border thereof and in the coupled condition of said housing members closing said opening with said tongue projecting into and extending along said groove, means for releasably locking said housing members in coupled condition, a resilient packing superimposed on a face of said tongue with said tongue being embraced between said groove opposing faces to compress said packing in the coupled condition of said housing members, a film cartridge chamber located in said hollow member and having a rear opening, an auxilliary cover separably closing said rear opening and a pressure plate mounted on the inside face of said lid and bearing on and retaining said cover in closed condition in the coupled condition of said housing members.

16. A waterproof camera comprising: a camera body case immediately housing a camera mechanism, said case having an opening and a film chamber accessible through said opening;
a lid member separably intercoupled to said case;
a resilient packing enclosing said opening, said resilient packing positioned between said case and lid member; and
an auxilliary lid member for opening and closing said film chamber.

17. The waterproof camera of claim 16, wherein said auxilliary lid member has a window and said lid member is made of transparent material.

18. A waterproof camera as set forth in claim 16, wherein said lid member and said auxilliary lid member respectively have window portions for verification of the existence of a film cartridge loaded in said film chamber.

19. A waterproof camera as set forth in claim 18, wherein said camera mechanism includes a viewfinder system having an eyepiece located within said opening and located beside said auxilliary lid member, and wherein said lid member also has a transparent portion in alignment with an optical axis of said viewfinder system.

20. A waterproof camera as set forth in claim 19, wherein said camera mechanism includes a battery chamber accessible through said opening, said waterproof housing structure further comprising a second auxilliary lid member for opening and closing said battery chamber independently of said auxilliary lid member.

21. A waterproof housing structure for cameras comprising: an outer case for housing a camera mechanism, said outer case having an opening and a film chamber accessible through said opening;
a lid member separably intercoupled to said outer case;
a resilient packing enclosing said opening, said resilient packing positioned between said outer case and lid member;
an auxilliary lid member for opening and closing said film chamber; and
a pressure plate secured to said lid member for urging said auxilliary lid member toward said film chamber.

* * * * *